US010699426B2

(12) United States Patent
Akahori

(10) Patent No.: US 10,699,426 B2
(45) Date of Patent: Jun. 30, 2020

(54) REGISTRATION APPARATUS, REGISTRATION METHOD, AND REGISTRATION PROGRAM

(71) Applicant: FUJIFILM Corporation, Tokyo (JP)

(72) Inventor: Sadato Akahori, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 121 days.

(21) Appl. No.: 15/954,764

(22) Filed: Apr. 17, 2018

(65) Prior Publication Data

US 2018/0308244 A1 Oct. 25, 2018

(30) Foreign Application Priority Data

Apr. 20, 2017 (JP) ................................ 2017-083403

(51) Int. Cl.

| | |
|---|---|
| ***G06K 9/00*** | (2006.01) |
| ***G06T 7/33*** | (2017.01) |
| ***G06T 7/00*** | (2017.01) |
| ***G06K 9/46*** | (2006.01) |
| ***G06T 7/38*** | (2017.01) |
| ***G06K 9/68*** | (2006.01) |

(52) U.S. Cl.

CPC .............. *G06T 7/337* (2017.01); *G06K 9/469* (2013.01); *G06K 9/4638* (2013.01); *G06K 9/4642* (2013.01); *G06K 9/6892* (2013.01); *G06T 7/0016* (2013.01); *G06T 7/38* (2017.01); *G06K 2209/05* (2013.01); *G06T 2207/10072* (2013.01); *G06T 2207/10081* (2013.01); *G06T 2207/10088* (2013.01); *G06T 2207/20021* (2013.01); *G06T 2207/20072* (2013.01); *G06T 2207/30004* (2013.01)

(58) Field of Classification Search

CPC ................................................... G06K 9/6892

See application file for complete search history.

(56) References Cited

U.S. PATENT DOCUMENTS 7,599,539 B2 10/2009 Kunz et al.
9,275,452 B2 * 3/2016 Schwartz ............. G06T 11/008
(Continued)

FOREIGN PATENT DOCUMENTS

JP 2001-137230 A 5/2001
JP 2009-232981 A 10/2009

OTHER PUBLICATIONS

Lorenzo Torresani, et al., "Feature Correspondence via Graph Matching: Models and Global Optimization", ECCV, 2008, pp. 1-14.

*Primary Examiner* — Oneal R Mistry
(74) *Attorney, Agent, or Firm* — Sughrue Mion, PLLC

(57) ABSTRACT

Similarity acquisition means calculates a similarity in each combination of an examination cross-sectional image and a reference cross-sectional image between examination volume data and reference volume data. Adjustment value acquisition means acquires an adjustment value of the similarity based on a relationship between the cross-sectional positions of examination cross-sectional images in two combinations and a relationship between the cross-sectional positions of reference cross-sectional images in the two combinations. Association means associates the examination cross-sectional image and the reference cross-sectional image with each other based on a sum of all the similarities and all the adjustment values.

7 Claims, 8 Drawing Sheets

1
2
6
5
9
3
4

(56) References Cited

U.S. PATENT DOCUMENTS

2008/0240494 A1* 10/2008 Oosawa ................ G06F 19/321
382/100
2012/0262453 A1* 10/2012 Endo ...................... A61B 8/483
345/419
2014/0235998 A1* 8/2014 Kim .......................... G06T 7/33
600/424

* cited by examiner p1
p2
p3
p4
p5
q1
q2
q3
q4
q5
q6
q7

FIG. 9 m

| | $p_1$ | $p_2$ | $p_3$ | $p_4$ | $p_5$ | $p_6$ | $p_7$ | $(p_i)$ |
|---|---|---|---|---|---|---|---|---|
| $q_1$ | 1 | 0 | 0 | 0 | 0 | 0 | 0 | |
| $q_2$ | 0 | 0 | 1 | 0 | 0 | 0 | 0 | |
| $q_3$ | 0 | 1 | 0 | 0 | 0 | 0 | 0 | |
| $q_4$ | 0 | 0 | 0 | 0 | 0 | 1 | 0 | |
| $q_5$ | 0 | 0 | 0 | 1 | 0 | 0 | 0 | |
| $q_6$ | 0 | 0 | 0 | 0 | 1 | 0 | 0 | |
| $q_7$ | 0 | 0 | 0 | 0 | 0 | 0 | 1 | |
| $(q_j)$ | | | | | | | | |

REGISTRATION APPARATUS, REGISTRATION METHOD, AND REGISTRATION PROGRAM

CROSS-REFERENCE TO RELATED APPLICATION

This application claims priority from Japanese Patent Application No. 2017-083403, filed on Apr. 20, 2017, the disclosure of which is incorporated by reference herein in its entirety.

BACKGROUND

Field of the Invention

The present invention relates to a registration apparatus, a registration method, a registration program for registering a cross-sectional image obtained by imaging a human body or an animal.

Related Art

With an increase in the speed of image capturing apparatuses (modalities), such as computed tomography (CT) apparatuses and magnetic resonance imaging (MRI) apparatuses, or an improvement in performance, such as multi-slice correspondence, it has become possible to acquire volume data by imaging a plurality of parts of a subject in one imaging series. As a result, since each part of a subject does not need to be imaged repeatedly and the total imaging time is shortened, the burden on the patient is reduced.

In the case of interpreting the volume data of CT, MRI, and the like on the interpretation viewer, the volume data is observed by sequentially switching and displaying two-dimensional cross-sections on one window. At the time of interpretation, a plurality of pieces of volume data are compared in many cases. In this case, it is necessary to designate a cross section to be displayed for each piece of volume data, and it is troublesome to repeatedly designate a cross section to be displayed each time the observation position is changed. In a case where it is necessary to check the temporal change of a lesion found in the previous examination, it is necessary to search for a cross section corresponding to the place where the lesion was found from the current volume data. Therefore, since the time or labor required for such work is large, this is the burden on the radiologist.

In order to solve such a problem, various methods for analyzing the volume data for automatic registration have been proposed. For example, U.S. Pat. No. 7,599,539B has proposed a method of performing registration between cross-sectional images by finding anatomical landmarks. JP2001-137230A discloses a method of extracting a lung field region, a heart region, and a descending aorta region from each of a past image and a current image and then finding corresponding cross sections using a matching value between cross-sectional images. JP2009-232981A discloses a method of determining a part of each cross-sectional image using a discriminator and performing registration according to whether or not the determined part is located along the arrangement of parts of the body and whether or not the length of the determined part in the body axis direction is within a standard range.

However, in the case of fining anatomical landmarks and performing registration between cross-sectional images, registration on the screen where there is no landmark is not possible. In addition, in the method of comparing two-dimensional cross-sectional images, a plurality of images are collectively compared. Accordingly, there is a problem that an error tends to occur in a case where the shape of an organ changes due to breathing or the like and there is partial deformation.

In the method disclosed in JP2001-137230A, each image is divided into specific regions, such as a lung field region, a heart region, and a descending aorta region, and corresponding positions are found by using a matching value between the cross-sectional images. Therefore, another region should be specified depending on whether to perform registration of the chest or perform registration of the abdomen. In the method disclosed in JP2009-232981A, since a part is determined using a discriminator, a discriminator corresponding to the anatomical structure should be prepared in advance.

SUMMARY

Therefore, in order to solve the aforementioned problems, it is an object of the invention to provide a registration apparatus, a registration method, and a registration program for performing registration accurately and stably.

A registration apparatus of the invention comprises: storage means for storing examination volume data including a plurality of examination cross-sectional images and reference volume data including a plurality of reference cross-sectional images; similarity acquisition means for acquiring a similarity in each of combinations of the examination cross-sectional images and the reference cross-sectional images between the examination volume data and the reference volume data; adjustment value acquisition means for acquiring an adjustment value of the similarity based on a relationship between a cross-sectional position of an examination cross-sectional image included in a first combination of the two combinations and a cross-sectional position of an examination cross-sectional image included in a second combination and a relationship between a cross-sectional position of a reference cross-sectional image included in the first combination and a cross-sectional position of a reference cross-sectional image included in the second combination; and association means for associating the examination cross-sectional image and the reference cross-sectional image with each other based on a sum of all the similarities acquired by the similarity acquisition means in the combinations of the examination cross-sectional images and the reference cross-sectional images and all the adjustment values acquired by the adjustment value acquisition means in the two combinations.

A registration method of the invention is a registration method in a registration apparatus comprising storage means for storing examination volume data including a plurality of examination cross-sectional images and reference volume data including a plurality of reference cross-sectional images, similarity acquisition means, adjustment value acquisition means, and association means, and comprises: a similarity acquisition step in which the similarity acquisition means acquires a similarity in each of combinations of the examination cross-sectional images and the reference cross-sectional images between the examination volume data and the reference volume data; an adjustment value acquisition step in which the adjustment value acquisition means acquires an adjustment value of the similarity based on a relationship between a cross-sectional position of an examination cross-sectional image included in a first combination of the two combinations and a cross-sectional position of an examination cross-sectional image included in a second combination and a relationship between a cross-sectional position of a reference cross-sectional image included in the first combination and a cross-sectional position of a reference cross-sectional image included in the second combination; and an association step in which the association means associates the examination cross-sectional image and the reference cross-sectional image with each other based on a sum of all the similarities acquired by the similarity acquisition means in the combinations of the examination cross-sectional images and the reference cross-sectional images and all the adjustment values acquired by the adjustment value acquisition means in the two combinations.

A registration program of the invention causes a computer to function as: storage means for storing examination volume data including a plurality of examination cross-sectional images and reference volume data including a plurality of reference cross-sectional images; similarity acquisition means for acquiring a similarity in each of combinations of the examination cross-sectional images and the reference cross-sectional images between the examination volume data and the reference volume data; adjustment value acquisition means for acquiring an adjustment value of the similarity based on a relationship between a cross-sectional position of an examination cross-sectional image included in a first combination of the two combinations and a cross-sectional position of an examination cross-sectional image included in a second combination and a relationship between a cross-sectional position of a reference cross-sectional image included in the first combination and a cross-sectional position of a reference cross-sectional image included in the second combination; and association means for associating the examination cross-sectional image and the reference cross-sectional image with each other based on a sum of all the similarities acquired by the similarity acquisition means in the combinations of the examination cross-sectional images and the reference cross-sectional images and all the adjustment values acquired by the adjustment value acquisition means in the two combinations.

It is preferable that the combination is obtained by associating the examination cross-sectional image and the reference cross-sectional image with each other so as to satisfy conditions in which the number of reference cross-sectional images associated with the examination cross-sectional image is one or less and the number of examination cross-sectional images associated with the reference cross-sectional images is one or less and combining the examination cross-sectional image and the reference cross-sectional image associated with each other.

It is preferable that the similarity acquisition means acquires the similarity based on a histogram of the examination cross-sectional image and the reference cross-sectional image.

It is preferable that, in a case where an order of cross-sectional positions of an examination cross-sectional image included in the first combination and an examination cross-sectional image included in the second combination is the same as an order of cross-sectional positions of a reference cross-sectional image included in the first combination and a reference cross-sectional image included in the second combination, the adjustment value acquisition means sets the adjustment value to a value that makes the similarity higher than in a case where the order of cross-sectional positions of the examination cross-sectional image included in the first combination and the examination cross-sectional image included in the second combination is not the same as the order of cross-sectional positions of the reference cross-sectional image included in the first combination and the reference cross-sectional image included in the second combination.

The association means may determine the examination cross-sectional image to be associated with the reference cross-sectional image using a graph matching method.

According to the invention, the similarity between cross-sectional images of examination volume data and reference volume data is calculated, the adjustment value of the similarity is acquired based on the relationship between the cross-sectional positions, and the corresponding examination cross-sectional image is associated with the reference cross-sectional image based on the sum of the similarities and the adjustment values so that the similarity between the cross-sectional images of the examination volume data and the reference volume data is the highest. Therefore, since cross-sections are accurately associated with each other between two pieces of volume data, it is possible to improve working efficiency at the time of interpretation.

BRIEF DESCRIPTION OF THE DRAWINGS

FIG. 9 is a diagram illustrating association between the reference volume data and the examination volume data.

DETAILED DESCRIPTION

Figure 1:
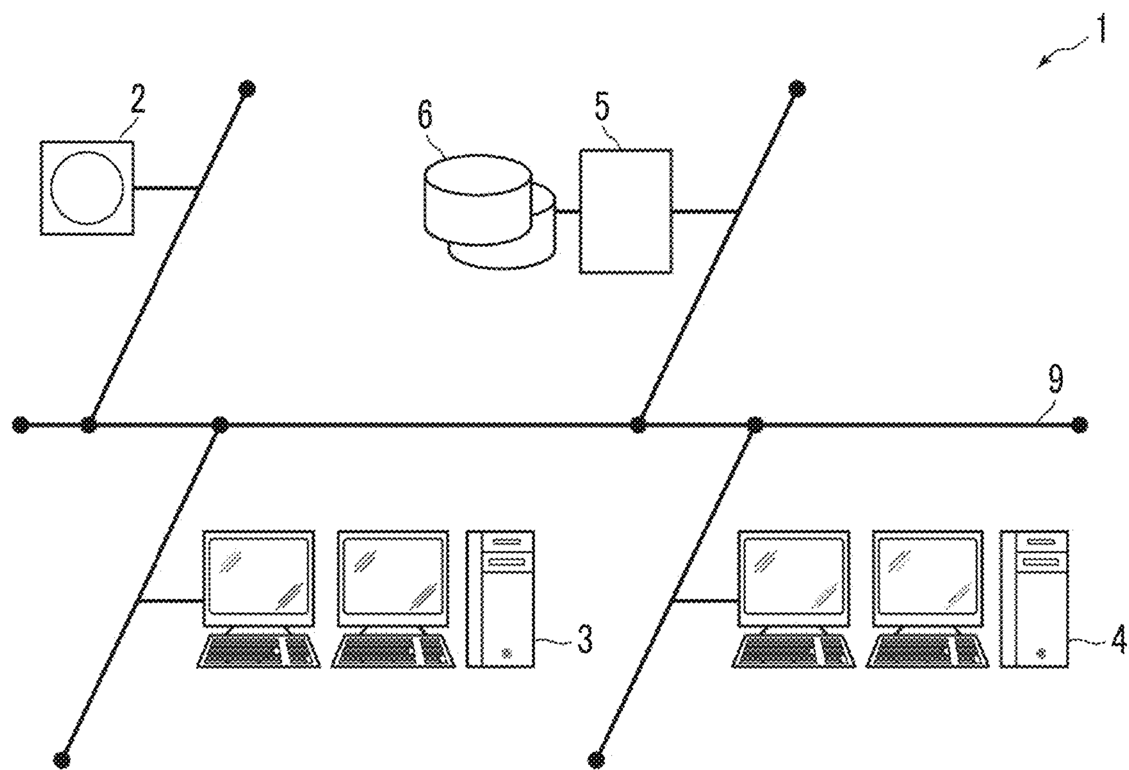
FIG. 1 is a diagram showing the schematic configuration of a medical information system in which a registration apparatus according to an embodiment of the invention is introduced.

FIG. 1 shows the schematic configuration of a medical information system 1 in which a registration apparatus according to an embodiment of the invention is introduced. The medical information system 1 is a system for performing imaging of an examination target part of a subject and storage of the obtained image, interpretation of an image captured by a radiologist in a radiology department, and detailed observation of an image to be interpreted by a doctor in a medical department of a requester, based on an examination order from a doctor of a medical department using a known ordering system. As shown in FIG. 1, the medical information system 1 is configured to include a modality 2, a workstation for radiologists 3, a medical department workstation 4, an image management server 5, and an image database 6 that are communicably connected to each other through a network 9. An application program for causing each apparatus to function as a component of the medical information system 1 is installed. The application program may be installed from a recording medium, such as a CD-ROM, or may be installed after being downloaded from a storage device of a server connected through a network, such as the Internet.

The modality 2 includes an apparatus that generates volume data indicating an examination target part of a subject by imaging the examination target part of the subject, adds supplementary information specified by the DICOM standard to the examination image, and outputs the examination image. Specific examples include a CT apparatus, an MRI apparatus, and the like.

The workstation for radiologists 3 is a computer used by a radiologist in the radiology department for image interpretation and creation of an interpretation report, and has a known hardware configuration, such as a central processing unit (CPU), a main storage device, an auxiliary storage device, an input and output interface, a communication interface, an input device, a display device, and a data bus. A known operating system or the like is installed on the workstation for radiologists 3, and one or a plurality of high-definition displays are provided as a display device. In the workstation for radiologists 3, each process, such as an image transmission request to the image management server 5, display of an image received from the image management server 5, automatic detection and highlighting of a lesion-like portion in an image, and creation and display of an interpretation report, is performed by executing a software program for each process.

The medical department workstation 4 is a computer used by a doctor in the medical department for detailed observation of images or viewing of interpretation reports and for viewing and inputting of electronic medical records, and has a known hardware configuration, such as a CPU, a main storage device, an auxiliary storage device, an input and output interface, a communication interface, an input device, a display device, and a data bus. A known operating system or the like is installed on the medical department workstation 4, and one or a plurality of high-definition displays are provided as a display device. In the medical department workstation 4, each process, such as an image viewing request to the image management server 5, display of an image received from the image management server 5, and automatic detection or highlighting of a lesion-like portion in an image, is performed by executing a software program for each process.

The image management server 5 has a software program for providing a function of a data base management system (DBMS) to a general-purpose computer. The image management server 5 includes a large capacity storage in which the image database 6 is formed. This storage may be a large capacity hard disk device connected to the image management server 5 through a data bus, or may be a disk device connected to a storage area network (SAN) or a network attached storage (NAS) connected to the network 9.

In the image database 6, examination images (including volume data configured to include a plurality of examination images) obtained by imaging a plurality of patients with the modality 2 and supplementary information are registered. The supplementary information includes, for example, an image identification (ID) for identifying each image, a patient ID for identifying a subject, an examination ID for identifying an examination, a unique identification (UID) allocated for each medical image, examination date and examination time at which the medical image is generated, the type of a modality used in an examination for acquiring the medical image, patient information such as patient's name, age, and gender, an examination part (imaging part), imaging conditions (whether or not a contrast medium is used, radiation dose, and the like), and information such as a series number in a case where a plurality of cross-sectional images are acquired in one examination.

In a case where a viewing request from the workstation for radiologists 3 is received through the network 9, the image management server 5 searches for the examination image registered in the image database 6 and transmits the extracted examination image to the workstation for radiologists 3 that is an examination image request source.

The network 9 is a local area network that connects various apparatuses in a hospital. In a case where the workstation for radiologists 3 is installed in another hospital or clinic, the network 9 may be configured to connect local area networks of respective hospitals through the Internet or a dedicated circuit. In any case, the network 9 is preferably a network capable of realizing high-speed transfer of medical images, such as an optical network.

In a case where a user, such as an image diagnostician, performs an operation of making a request for interpretation and viewing of the observation target image, the workstation for radiologists 3 transmits a viewing request to the image management server 5 and acquires a required image. Then, the image is displayed on a display. The workstation for radiologists 3 has a function of the registration apparatus of the invention, and this processing is realized by executing the installed application program.

Figure 2:
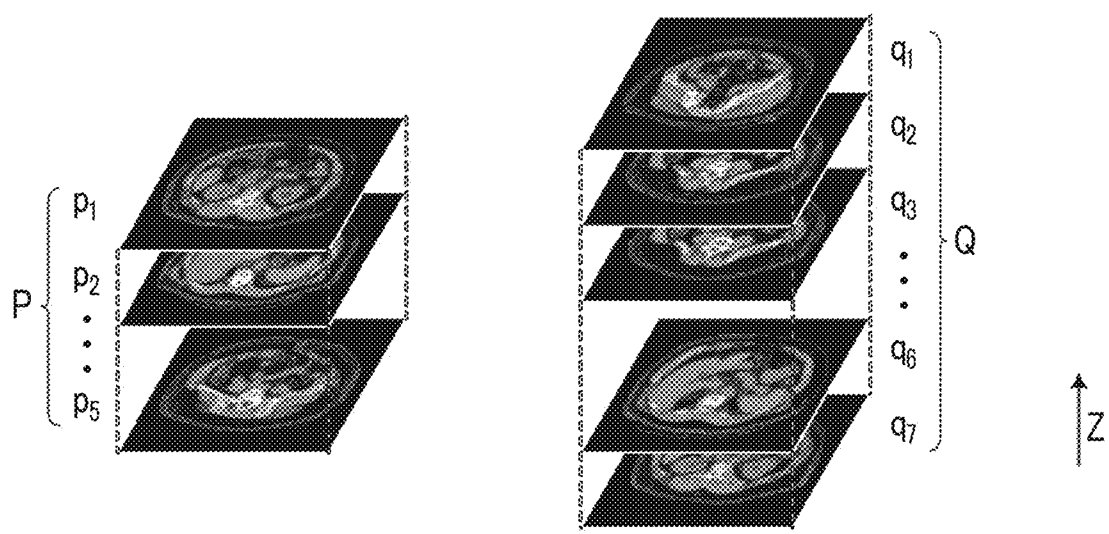
FIG. 2 is a functional block diagram of the registration apparatus of the invention.

FIG. 2 is a block diagram schematically showing the configuration of the registration apparatus according to the embodiment of the invention, which is mounted in the workstation for radiologists 3, and the flow of data. The registration apparatus of the invention will be described below as a registration processing unit of the workstation for radiologists 3. As shown in FIG. 2, a registration processing unit 30 of the invention is configured to include reception means 31, association means 32, storage means 33, and display means 34. One or a plurality of displays 35 are connected to the display means 34.

In the workstation for radiologists 3, in a case where the patient ID of an examination target is input by the user, such as a radiologist, the patient ID of the examination target and an image transmission request are transmitted from the workstation for radiologists 3 to the image management server 5, and the reception means 31 receives examination volume data Q and reference volume data P searched for from the image database 6. The examination volume data Q and the reference volume data P that have been received are temporarily stored in the storage means 33. The examination volume data Q and the reference volume data P are configured to include a plurality of cross-sectional images capture by the CT imaging apparatus or the MRI imaging apparatus. The following explanation will be given on the assumption that the examination volume data Q and the reference volume data P are images captured by the same modality 2 and the cross-sectional directions are the same.

The association means 32 includes similarity acquisition means 36 and adjustment value acquisition means 37, and selects an examination cross-sectional image q similar to a reference cross-sectional image p forming the reference volume data P from the examination volume data Q and associates the examination cross-sectional image q with the reference cross-sectional image p. In the case of associating the examination cross-sectional image q and the reference cross-sectional image p with each other, two or more examination cross-sectional images q are not associated with one reference cross-sectional image p. In a case where the number of examination cross-sectional images q included in the examination volume data Q is smaller than the number of reference cross-sectional images p included in the reference volume data P, there may be no examination cross-sectional image q associated with the reference cross-sectional image p. In addition, the same examination cross-sectional image q is not associated with two or more reference cross-sectional images p. That is, the number of examination cross-sectional images q associated with the reference cross-sectional image p is one or less, and the number of reference cross-sectional images p associated with the examination cross-sectional image q included in the examination data is also one or less.

The similarity acquisition means 36 calculates a similarity for each combination of one of the reference cross-sectional images p included in the reference volume data P and one of the examination cross-sectional images q included in the examination volume data. As the similarity, a similarity between the pixel data of the reference cross-sectional image p and the examination cross-sectional image q is calculated. Specifically, the similarity can be acquired using cross-correlation, histogram intersection, and the like. Pixel data refers to a group of pixels forming an image, and the pixel data will be described below so as to be distinguished from supplementary information of an image, such as a DICOM tag, a file name, and imaging date and time.

In two combinations of the reference cross-sectional image p and the examination cross-sectional image q, the adjustment value acquisition means 37 calculates an adjustment value of the similarity based on the relationship between the reference cross-sectional image p included in a first combination a and the reference cross-sectional image p included in a second combination b and the relationship between the examination cross-sectional image q included in the first combination a and the examination cross-sectional image q included in the second combination b. The reference cross-sectional image p and the examination cross-sectional image q may be similar even if the cross-sectional positions are reversed. Therefore, in a case where the relationship between the cross-sectional positions of the two reference cross-sectional images p included in the combinations a and b is the same as the relationship between the cross-sectional positions of the two examination cross-sectional images q included in the combinations a and b, the adjustment value is set to a value such that the similarity is higher than that in a case where the relationship between the cross-sectional positions of the two reference cross-sectional images p included in the combinations a and b is not the same as the relationship between the cross-sectional positions of the two examination cross-sectional images q included in the combinations a and b.

For example, in the case of an axial image, in a case where the relationship between the cross-sectional positions of the two reference cross-sectional images p, which are included in the combinations a and b, in the body axis direction (Z-axis direction) is the same as the relationship between the cross-sectional positions of the two examination cross-sectional images q, which are included in the combinations a and b, in the Z-axis direction, the adjustment value is set to a value such that the similarity is higher than that in a case where the relationship between the cross-sectional positions of the two reference cross-sectional images p, which are included in the combinations a and b, in the Z-axis direction is not the same as the relationship between the cross-sectional positions of the two examination cross-sectional images q, which are included in the combinations a and b, in the Z-axis direction.

Figure 3:
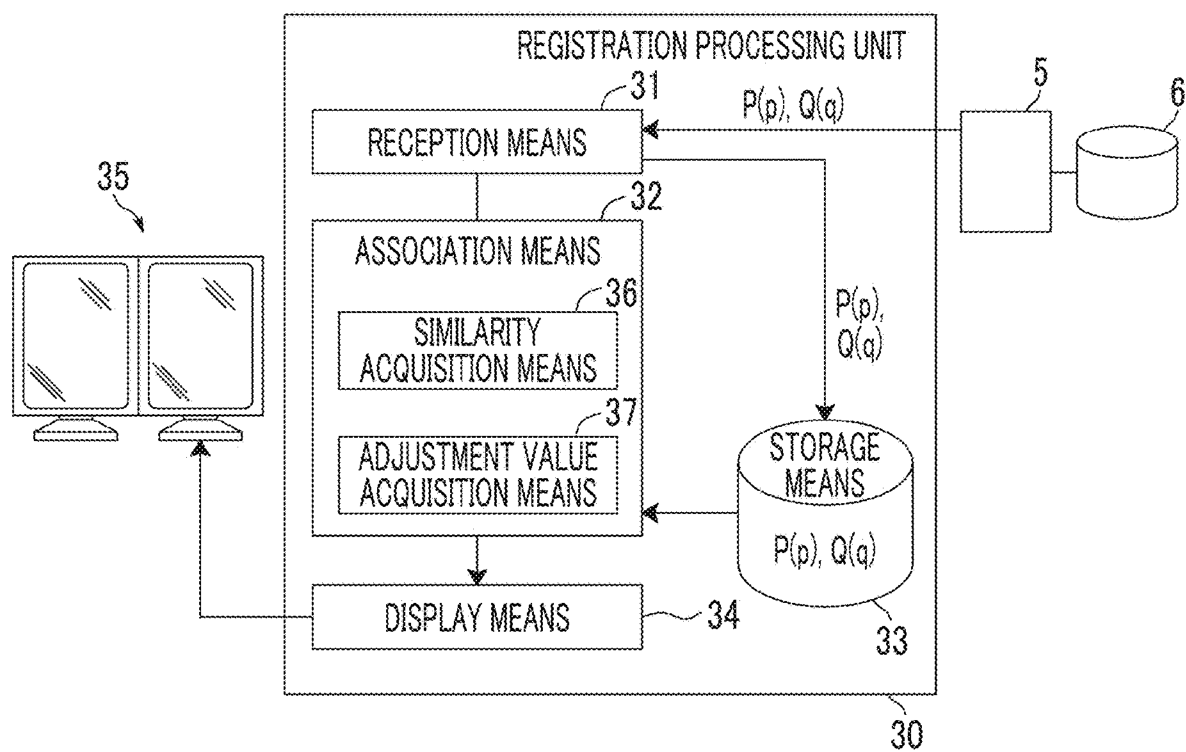
FIG. 3 is a flowchart of a process for associating reference volume data and examination volume data with each other.
Figure 4:
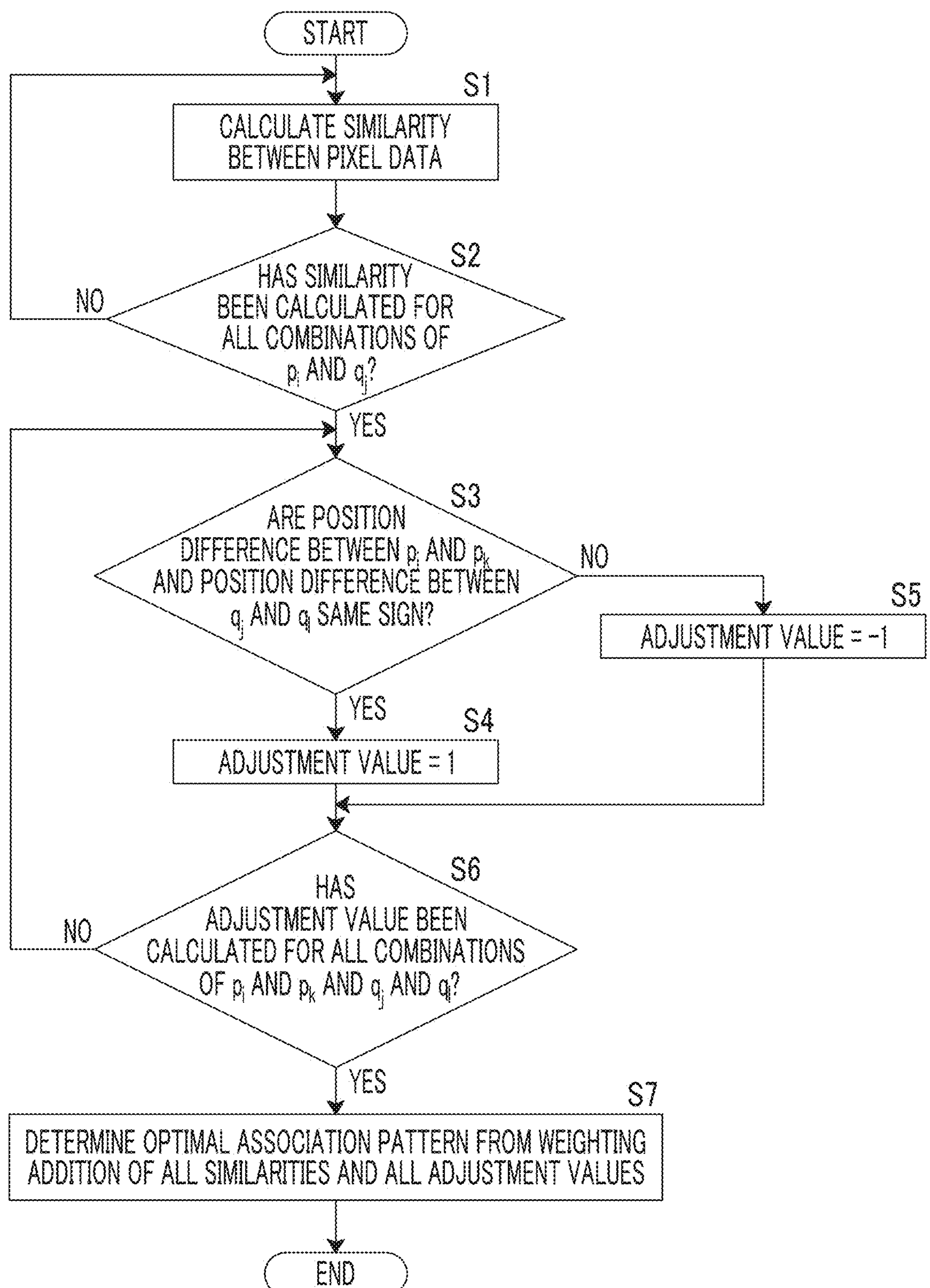
FIG. 4 is a diagram showing examples of reference cross-sectional images forming reference volume data and examination cross-sectional images forming examination volume data.
Figure 5:
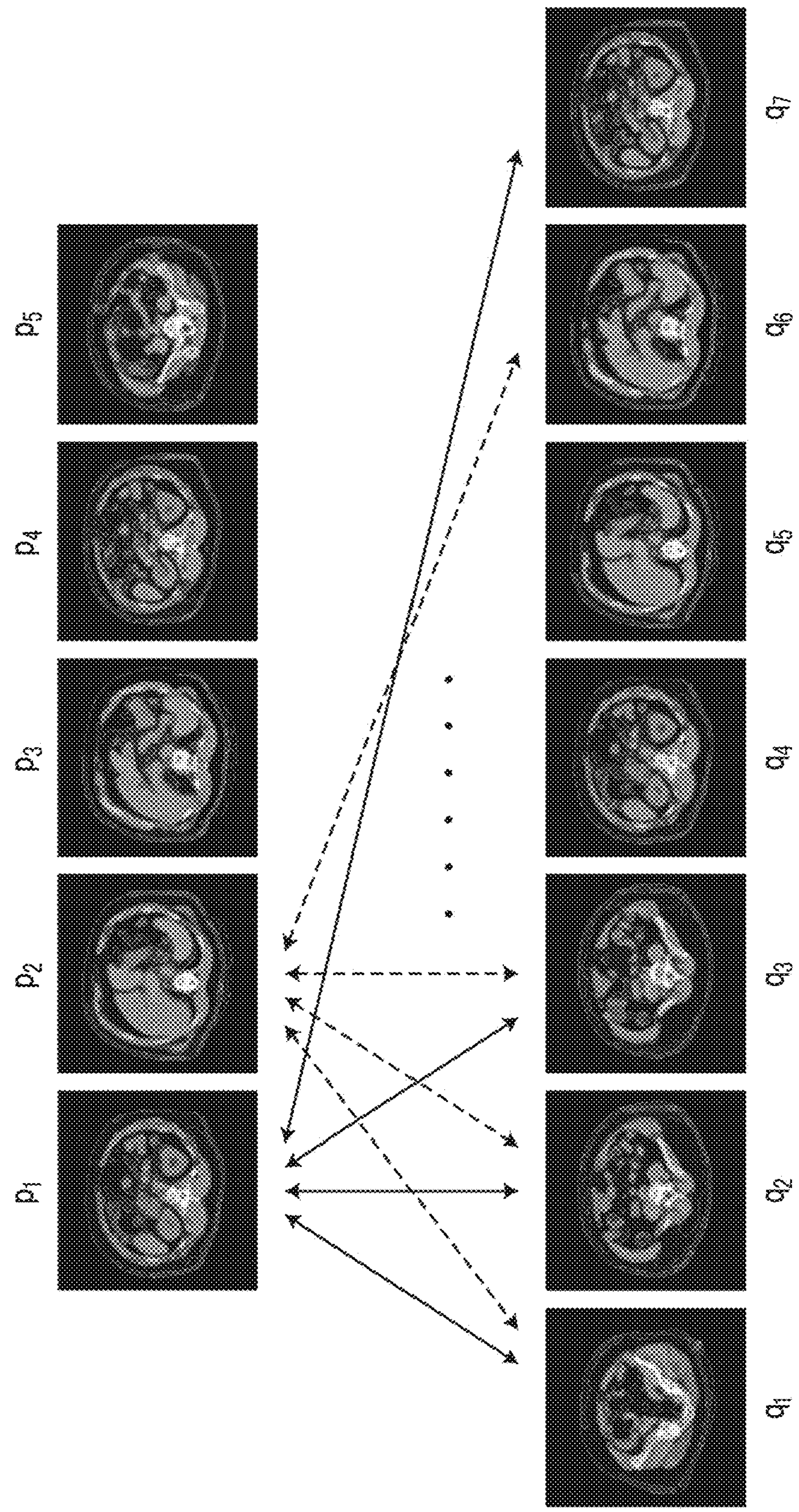
FIG. 5 is a diagram showing examples of a reference cross-sectional image and an examination cross-sectional image.

A process in which the reference cross-sectional image p and the examination cross-sectional image q are associated with each other using the similarity and the adjustment value will be specifically described with reference to the flowchart of FIG. 3. FIG. 4 shows examples of the reference volume data P and the examination volume data Q. As shown in FIG. 4, reference cross-sectional images $p_1$ to $p_5$ forming the reference volume data P and examination cross-sectional images $q_1$ to $q_7$ forming the examination volume data Q are arranged along the Z-axis direction. FIG. 5 shows examples of reference cross-sectional images $p_1$ to $p_5$ and examination cross-sectional images $q_1$ to $q_7$.

Figure 6:
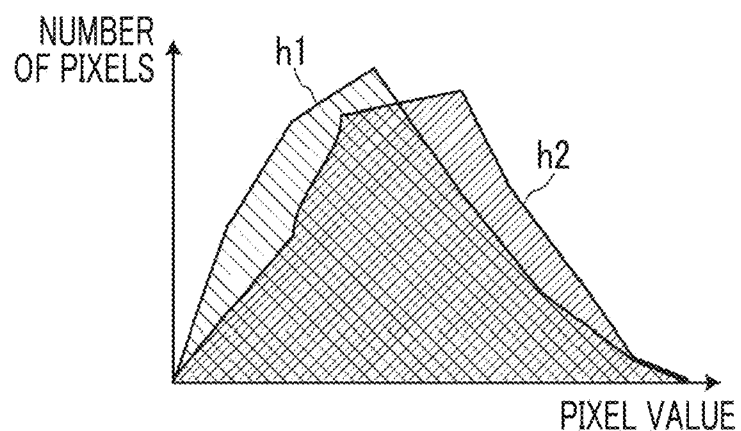
FIG. 6 is a diagram illustrating a method of calculating a similarity from histogram intersection.
Figure 7:
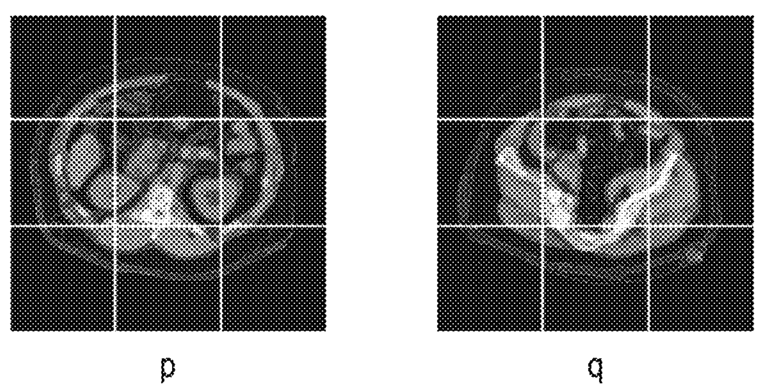
FIG. 7 is a diagram illustrating a method of calculating a similarity reflecting the composition of a screen.

The similarity acquisition means 36 calculates a similarity $\theta_a$ between the reference cross-sectional image p included in the reference volume data P and the examination cross-sectional image q included in the examination volume data Q using a histogram intersection. As shown in FIG. 6, the histogram intersection refers to a ratio of the intersection between a histogram h1 of the reference cross-sectional image $p_i$ and a histogram h2 of the examination cross-sectional image $q_j$, and the similarity $\theta_a$ is a value of 0 to 1.0. In order to reflect the rough composition of the screen, for example, each of the reference cross-sectional image $p_i$ and the examination cross-sectional image $q_j$ may be equally divided into three regions vertically and horizontally (refer to FIG. 7), a histogram intersection may be calculated in each divided section of 3×3 sections (=nine sections), and the average value may be set as the similarity $\theta_a$ (S1).

As shown in FIG. 5, the similarity $\theta_a$ is calculated for all combinations of the reference cross-sectional images $p_1$ to $p_5$ and the examination cross-sectional images $q_1$ to $q_7$. That is, the similarity $\theta_a$ between $p_i$ and each of $q_1, q_2, q_3, \ldots, q_7$ is calculated, and the similarity $\theta_a$ between $p_2$ and each of $q_1, q_2, q_3, \ldots, q_7$ is calculated. Similarly, the similarity $\theta_a$ between each of $p_3$ to $p_5$ and each of $q_1, q_2, q_3, \ldots, q_7$ is calculated. As described above, the calculation of the similarity $\theta_a$ is repeated until all combinations of $p_i$ and $q_j$ are completed (S2).

Then, the adjustment value acquisition means 37 calculates an adjustment value $\theta_{ab}$ of the similarity in a case where the reference volume data P and the examination volume data Q are associated with each other. As described above, the reference cross-sectional image $p_i$ and the examination cross-sectional image $q_j$ are associated with each other such that the number of examination cross-sectional images $q_j$ associated with the reference cross-sectional image $p_i$ is one or less and the number of reference cross-sectional images $p_i$ associated with the examination cross-sectional image $q_j$ included in the examination data is also one or less. Which association among all association patterns in the case of performing association so as to satisfy such association conditions is optimal is adjusted by using not only the similarity $\theta_a$ between the pixel data of the reference cross-sectional image $p_i$ and the examination cross-sectional image $q_j$ but also the adjustment value based on the relationship between the cross-sectional positions.

In a case where the examination cross-sectional image $q_j$ is associated with the reference cross-sectional image $p_i$ and the reference cross-sectional image $p_k$ is associated with the examination cross-sectional image $q_l$ between the reference volume data P and the examination volume data Q, the adjustment value $\theta_{ab}$ is calculated from the combination a of the reference cross-sectional image $p_i$ and the examination cross-sectional image $q_j$ and the combination b of the reference cross-sectional image $p_k$ and the examination cross-sectional image $q_l$. In a case where the sign of a difference ($D_a = z(p_k) - z(p_i)$) between the cross-sectional position $z(p_i)$ of the reference cross-sectional image $p_i$ and the cross-sectional position $z(p_k)$ of the reference cross-sectional image $p_k$ is the same as the sign of a difference ($D_b=z(q_l)-z(q_j)$) between the cross-sectional position $z(q_l)$ of the examination cross-sectional image $q_j$ and the cross-sectional position $z(q_l)$ of the examination cross-sectional image $q_l$ (S3—Yes), the adjustment value $\theta_{ab}$ is set to 1 (S4). In a case where the sign of the difference $D_a$ and the sign of the difference $D_b$ are not the same (S3—No), the adjustment value $\theta_{ab}$ is set to −1 (S5). The adjustment value $\theta_{ab}$ is calculated by repeating this for all the two combinations a and b in each association pattern (S6).

Figure 8A:
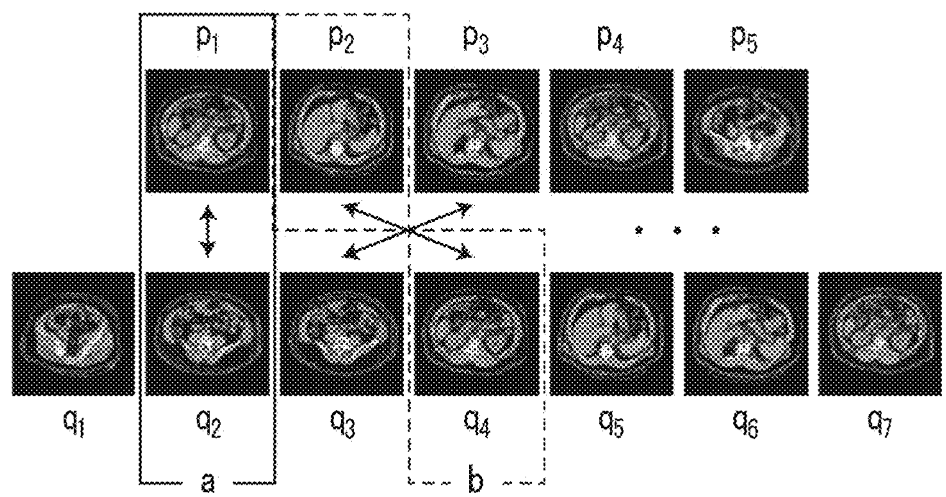
FIGS. 8A to 8C are diagrams illustrating a method of calculating an adjustment value.
Figure 8B:
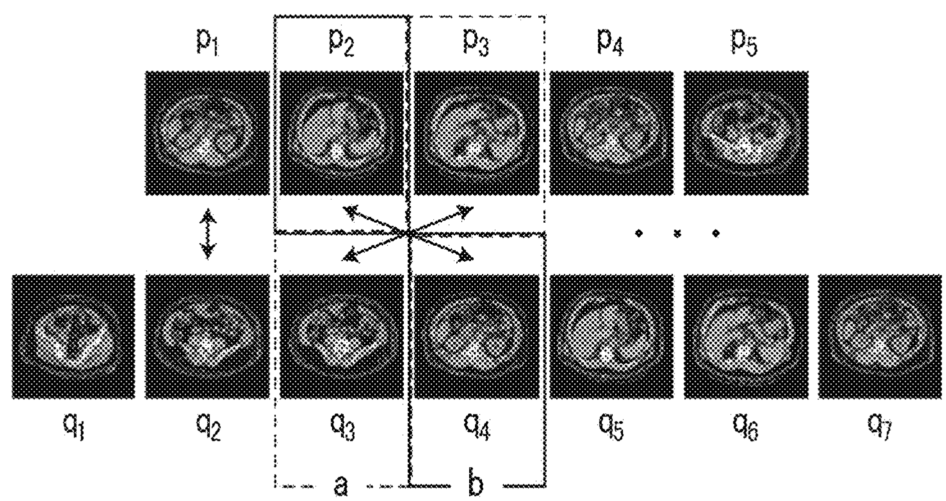
Figure 8C:
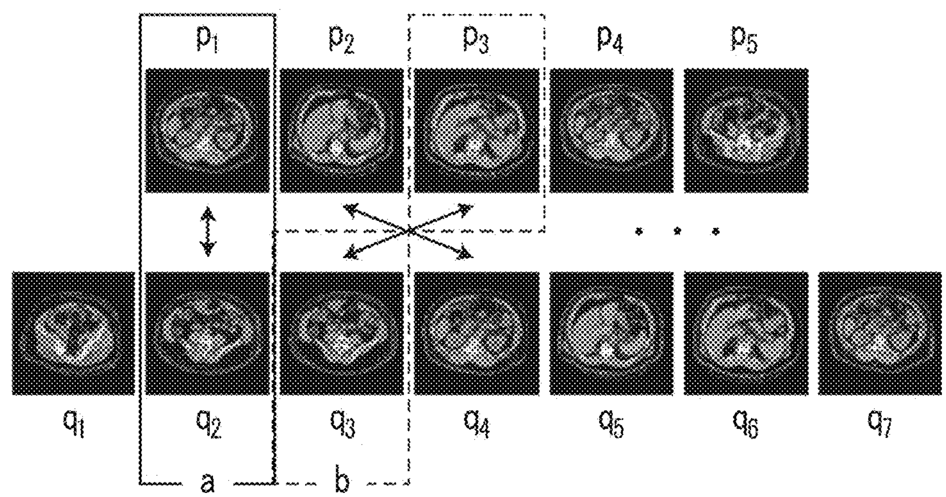

The method of calculating an adjustment value will be described in detail with reference to FIG. 8. An example of associating $p_1$ and $q_2$, $p_2$ and $q_4$, $p_3$ and $q_3$, . . . in a case where the examination cross-sectional image q of the examination volume data Q is arranged in the order of $q_1 \rightarrow q_2 \rightarrow q_3 \rightarrow q_4$ . . . in the Z-axis direction and the reference cross-sectional image p of the reference volume data P is arranged in the order of $p_1 \rightarrow p_2 \rightarrow p_3$ . . . in the Z-axis direction will be described. In the combination 1 of $p_i$ and $q_2$ and the combination 2 of $p_2$ and $q_4$ (FIG. 8A), the difference between the cross-sectional positions of $p_i$ and $p_2$ and the difference between the cross-sectional positions of $q_2$ and $q_4$ are the same. Therefore, the adjustment value $\theta_{ab}$ is set to 1. In the combination 2 of $p_2$ and $q_4$ and the combination 3 of $p_3$ and $q_3$ (FIG. 8B), the difference between the cross-sectional positions of $p_2$ and $p_3$ and the difference between the cross-sectional positions of $q_4$ and $q_3$ are not the same. Therefore, the adjustment value $\theta_{ab}$ is set to −1. In the combination 1 of $p_i$ and $q_2$ and the combination 3 of $p_3$ and $q_3$ (FIG. 8C), the difference between the cross-sectional positions of $p_1$ and $p_3$ and the difference between the cross-sectional positions of $q_2$ and $q_3$ are the same. Therefore, the adjustment value $\theta_{ab}$ is set to 1. In this manner, the adjustment value $\theta_{ab}$ is calculated for all the two combinations a and b.

As shown in FIG. 9, association of the reference cross-sectional image $p_i$ and the examination cross-sectional image $q_j$ between the reference volume data P and the examination volume data Q is expressed with an association matrix m of P×Q having binary data x of 0 and 1 as elements. In the association matrix m, the row indicates the reference cross-sectional image $p_i$ and the column indicates the examination cross-sectional image $q_j$. An element $x_{ij}$ in the i-th row and the j-th column indicates whether or not to associate the reference cross-sectional image $p_i$ with the examination cross-sectional image $q_j$. The element $x_{ij}$ in the i-th row and the j-th column is set to 0 in a case where the reference cross-sectional image $p_i$ is associated with the examination cross-sectional image $q_j$, and is set to 1 in a case where the reference cross-sectional image $p_i$ is not associated with the examination cross-sectional image $q_j$. In this case, all association patterns that associate the reference cross-sectional image $p_i$ and the examination cross-sectional image $q_j$ with each other are created so as to satisfy the conditions in which at most one examination cross-sectional image $q_j$ is associated with the reference cross-sectional image $p_i$ and at most one reference cross-sectional image $p_i$ is associated with the examination cross-sectional image $q_j$. A set M of association patterns expressed by the association matrix m can be expressed by the following Equation (1).

$$M = \left\{ x \in \{0, 1\}^{P \times Q} \,\middle|\, \sum_{p \in P} x_{pq} \le 1, \sum_{q \in Q} x_{pq} \le 1 \right\} \tag{1}$$

In all the patterns that associate the reference cross-sectional image $p_i$ and the examination cross-sectional image $q_j$ included in the set M with each other, a similarity between the reference cross-sectional image $p_i$ of the reference volume data P and the examination cross-sectional image $q_j$ of the examination volume data Q is calculated, and the reference cross-sectional image $p_i$ and the examination cross-sectional image $q_j$ are associated with each other with a pattern having the highest similarity (S7). This can be replaced with a problem of maximizing the following Equation (2) in which the similarity $\theta_a$ calculated by the similarity acquisition means 36 and the adjustment value $\theta_{ab}$ calculated by the adjustment value acquisition means 37 are weighted and added. For example, this problem can be solved using the graph matching method described in the document "L. Torresani, V. Kolmogorov, and C. Rother: "Feature correspondence via graph matching: Models and global optimization", ECCV 2008". In the following Equation (2), the first term means that all of the similarities $\theta_a$ of the combination of the reference cross-sectional image $p_i$ and the examination cross-sectional image $q_j$ at which $x_{ij}=1$ are added, and the second term means that all the adjustment values $\theta_{ab}$ obtained from the relationship between the two combinations (combination a and combination b) of the reference cross-sectional image $p_i$ and the examination cross-sectional image $q_j$ at which $x_{ij}=1$ in the association matrix m of FIG. 9 are weighted and added. It is preferable that the coefficient K is an empirically optimal value.

$$\max_{x \in M} E(x \mid \theta) = \sum_{a \in A} \theta_a x_a + k \sum_{(a,b) \in N} \theta_{ab} x_a x_b \tag{2}$$

Here, A indicates a set of combinations of the reference cross-sectional image $p_i$ and the examination cross-sectional image $q_j$. N indicates a set of the combination a of the reference cross-sectional image $p_i$ and the examination cross-sectional image $q_j$ and the combination b of the reference cross-sectional image $p_k$ and the examination cross-sectional image $q_l$. k indicates a coefficient for determining the load of similarity and adjustment value. $x_a$ indicates a value of the element $x_{ij}$ corresponding to the combination $a(p_i, q_j)$ in binary data x. $x_b$ indicates a value of an element $x_{kl}$ corresponding to the combination $b(p_k, q_l)$ in binary data x.

The display means 34 displays the reference cross-sectional image $p_i$ and the examination cross-sectional image $q_j$, which are associated with each other by the association means 32, so that the reference cross-sectional image $p_i$ and the examination cross-sectional image $q_j$, can be compared with each other. For example, the screen of the display 35 is divided into two parts, so that the reference cross-sectional image $p_i$ and the examination cross-sectional image $q_j$ associated with each other on the screen are displayed side by side.

Figure 10:
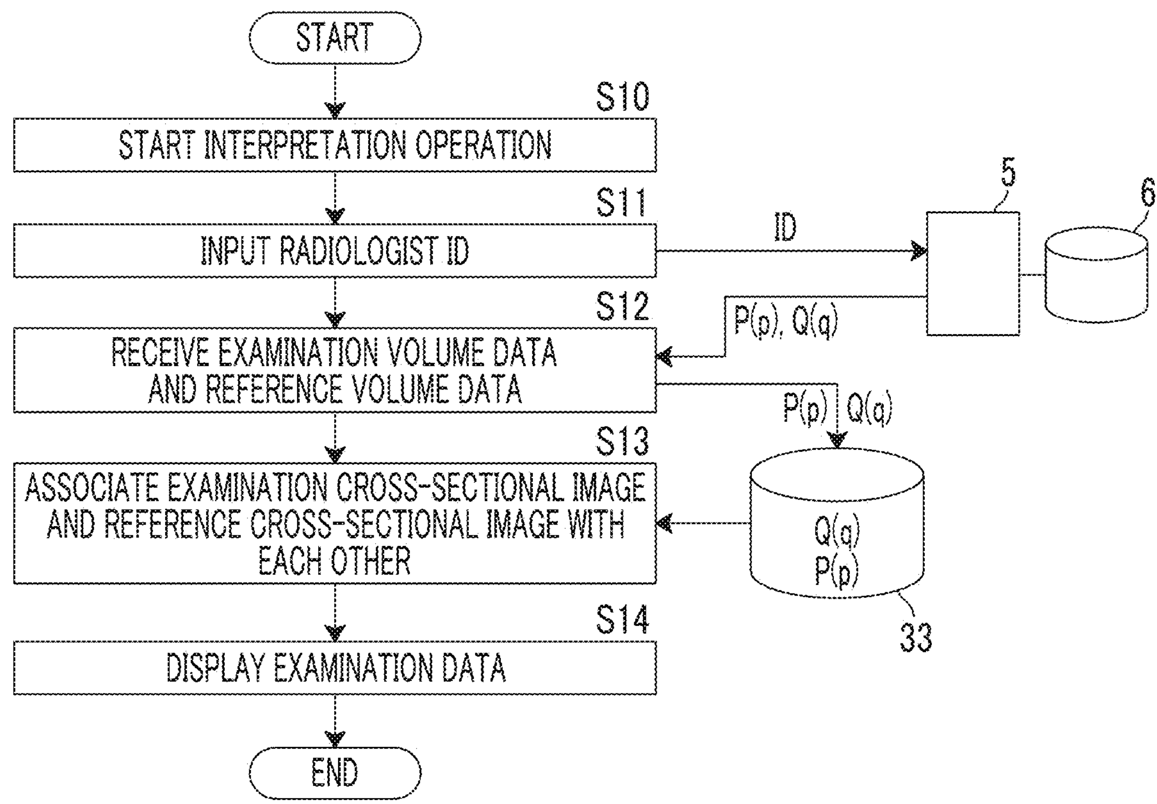
FIG. 10 is a flowchart illustrating the operation of the registration apparatus.

Next, the operation of the registration apparatus of the present embodiment will be described with reference to the flowchart of FIG. 10. A case where the examination volume data Q is a current diagnosis target image of a specific patient and the reference volume data P is an image obtained by capturing the same patient in the past will be described below.

In a case where a radiologist performs an operation for interpretation in the workstation for radiologists 3 (S10), the registration processing unit 30 is started.

Then, in a case where the radiologist inputs a patient ID of an examination target (S11), the reception means 31 of the workstation for radiologists 3 transmits the patient ID and a request for the transmission of the examination volume data Q and the reference volume data P to the image management server 5. The image management server 5 searches for the latest volume data to which the patient ID is assigned and volume data captured in the past from the image database 6, and transmits the latest volume data and the volume data to the workstation for radiologists 3. The reception means 31 stores the received latest volume data in the storage means 33 as the examination volume data Q, and stores the received past volume data in the storage means 33 as the reference volume data P (S12).

Using the association means 32 described in detail above, association is performed so that the similarity between the reference cross-sectional image p of the reference volume data P and the examination cross-sectional image q of the examination volume data Q is the highest (S13).

The display means 34 arranges and displays the reference cross-sectional image p and the examination cross-sectional image q associated with each other by the association means 32 on the screen so that the cross-sectional images whose cross-sectional positions are the same can be compared with each other (S14).

As described above, it is possible to associate the reference volume data with the examination volume data so that there is no contradiction for the positional relationship between the reference cross-sectional images and the positional relationship between the examination cross-sectional images.

In the above description, the case where the registration apparatus of the invention is provided in the workstation for radiologists 3 has been described. However, the registration apparatus of the invention may be provided in the medical department workstation 4 installed in each medical department so that a doctor in each medical department can use the registration apparatus to explain to the patient or the like.

What is claimed is:

1. A registration apparatus, comprising:

a memory configured to store executable instructions; and a processor configured to execute the executable instructions, which when executed by the processor cause the processor to perform the following functions:

storing examination volume data including a plurality of examination cross-sectional images and reference volume data including a plurality of reference cross-sectional images in image memory;

acquiring a similarity in each of combinations of the examination cross-sectional images and the reference cross-sectional images between the examination volume data and the reference volume data, the similarity in each of the combinations being calculated based on a similarity between pixels forming the examination cross-sectional images and pixels forming the reference cross-sectional images;

acquiring an adjustment value of the similarity based on whether a positional relationship between a cross-sectional position of the examination cross-sectional image included in a first combination of the two combinations and a cross-sectional position of the examination cross-sectional image included in a second combination of the two combinations is the same direction as a positional relationship between a cross-sectional position of the reference cross-sectional image included in the first combination and a cross-sectional position of the reference cross-sectional image included in the second combination, wherein, in a case where the positional relationships are the same, the adjustment value is set to a value that makes the similarity become higher than that in a case where the positional relationships are not the same; and associating the examination cross-sectional image and the reference cross-sectional image with each other based on a sum of all the similarities acquired by the similarity acquisition means in all combinations of the examination cross-sectional images and the reference cross-sectional images and all the adjustment values in the two combinations.

2. The registration apparatus according to claim 1, wherein the combination is obtained by associating the examination cross-sectional image and a reference cross-sectional image with each other so as to satisfy conditions in which a number of reference cross-sectional images associated with the examination cross-sectional image is one or less and a number of examination cross-sectional images associated with the reference cross-sectional images is one or less and combining the examination cross-sectional image and the reference cross-sectional image associated with each other.

3. The registration apparatus according to claim 1, wherein the similarity is acquired based on a histogram of the examination cross-sectional image and the reference cross-sectional image.

4. The registration apparatus according to claim 1, wherein, in a case where an order of cross-sectional positions of the examination cross-sectional image included in the first combination and the examination cross-sectional image included in the second combination is the same as an order of cross-sectional positions of a reference cross-sectional image included in the first combination and a reference cross-sectional image included in the second combination, adjusting the adjustment value comprises setting the adjustment value to a value that makes the similarity higher than in a case where the order of cross-sectional positions of the examination cross-sectional image included in the first combination and the examination cross-sectional image included in the second combination is not the same as the order of cross-sectional positions of the reference cross-sectional image included in the first combination and the reference cross-sectional image included in the second combination.

5. The registration apparatus according to claim 1, wherein the association means determines the examination cross-sectional image to be associated with the reference cross-sectional image using a graph matching method.

6. A registration method using a registration apparatus comprising a memory configured to store executable instructions and a processor to execute the executable instructions to perform:

storing examination volume data including a plurality of examination cross-sectional images and reference volume data including a plurality of reference cross-sectional images in image memory;

acquiring a similarity in each of combinations of the examination cross-sectional images and the reference cross-sectional images between the examination volume data and the reference volume data, the similarity in each of the combinations being calculated based on a similarity between pixels forming the examination cross-sectional images and pixels forming the reference cross-sectional images;

acquiring an adjustment value of the similarity based on whether a positional relationship between a cross-sectional position of the examination cross-sectional image included in a first combination of two combinations and a cross-sectional position of the examination cross-sectional image included in a second combination of the two combinations is the same direction as a positional relationship between a cross-sectional position of the reference cross-sectional image included in the first combination and a cross-sectional position of a reference cross-sectional image included in the second combination, wherein, in a case where the positional relations are the same, the adjustment value is set to a value that makes the similarity become higher than that in a case where the positional relationships are not the same; and associating the examination cross-sectional image and the reference cross-sectional image with each other based on a sum of all the similarities acquired by the similarity acquisition means in all combinations of the examination cross-sectional images and the reference cross-sectional images and all the adjustment values acquired for the two combinations.

7. A non-transitory computer-readable storage medium storing therein a registration program causing a computer to perform:

storing examination volume data including a plurality of examination cross-sectional images and reference volume data including a plurality of reference cross-sectional images in an image memory;

acquiring a similarity in each of combinations of the examination cross-sectional images and the reference cross-sectional images between the examination volume data and the reference volume data, the similarity in each of the combinations being claucluated based on similarity between pixels forming the examination cross-sectional images and pixels forming the reference cross-sectional images;

acquiring an adjustment value of the similarity based on whether a positional relationship between a cross-sectional position of the examination cross-sectional image included in a first combination of two combinations and a cross-sectional position of the examination cross-sectional image included in a second combination of the two combinations is the same direction as and a positional relationship between the cross-sectional position of a reference cross-sectional image included in the first combination and a cross-sectional position of a reference cross-sectional image included in the second combination, wherein, in a case where the positional relationships are the same, the adjustment value is set to a value that makes the similarity become higher than that in a case where the positional relationships are not the same; and associating the examination cross-sectional image and the reference cross-sectional image with each other based on a sum of all the similarities acquired in all combinations of the examination cross-sectional images and the reference cross-sectional images and all the adjustment values acquired in the two combinations.

* * * * *